May 21, 1929.　　　W. K. LEWIS　　　1,714,228

TEMPERATURE CONTROL FOR LIQUID CONTAINERS

Filed Sept. 19, 1924

SECTION AT II-II

Warren K. Lewis　Inventor

By　Attorney

Patented May 21, 1929.

1,714,228

UNITED STATES PATENT OFFICE.

WARREN K. LEWIS, OF NEWTON, MASSACHUSETTS, ASSIGNOR TO STANDARD OIL DEVELOPMENT COMPANY, A CORPORATION OF DELAWARE.

TEMPERATURE CONTROL FOR LIQUID CONTAINERS.

Application filed September 19, 1924. Serial No. 738,656.

This invention relates to improvements in temperature control for liquid storage receptacles, especially those of the type having heat insulated walls. The invention finds particularly advantageous application in the cold-settling of petroleum oils to separate amorphous waxy bodies. Reference will therefore be made principally to this use, but it is to be understood that various other uses of the principles and structure described may be made.

It has long been the practice to separate paraffin wax by refrigeration of the oil containing it. By reducing the temperature to the proper point and allowing the cooled oil to stand without agitation for a considerable time, the waxes which are solids at the temperature employed settle out in the form of a sludge. They may then be withdrawn and freed from residual oil by filter-pressing, centrifuging, or the like. In most cases, however, there is only a slight difference in density between the solidified wax and the liquid menstruum, although the latter ordinarily contains naphtha or other thinning agent. The separation of the wax is accordingly slow even under the best conditions.

I have discovered that warming of the oil adjacent to the side walls of the container, due to heat transference from the atmosphere through the wall insulation, produces upward currents which prevent complete quiescence of the liquid. These currents tend to elevate and distribute the particles of wax which have separated out. Thermal circulation of this nature may be an important factor in delaying or preventing complete separation of the wax.

In accordance with the present invention, this difficulty is avoided by the provision of temperature controlling means, preferably embedded in the insulation of the container walls. In an advantageous embodiment of the invention, a pipe or conduit is surrounded by the insulation and follows a circuitous route about the container. A fluid of proper temperature is passed through the pipe at such a rate that transference of heat from without is minimized and a substantially zero temperature gradient is maintained between the inner portion of the walls and the liquid which they confine. This effect is not obtainable by any heat insulation which can be practically applied on a commercial scale. Unless positive temperature controlling means are provided, objectionable heat exchange will ordinarily take place.

Reference is to be made to the accompanying drawing, in which

Figure 1:
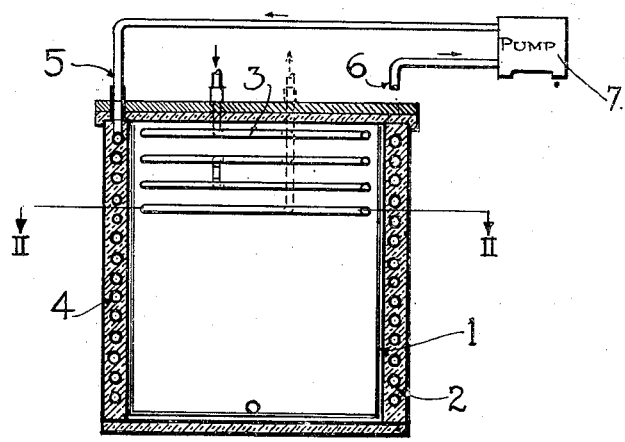
Fig. 1 is a vertical section through a tank with the improved temperature controlling means.
Figure 2:
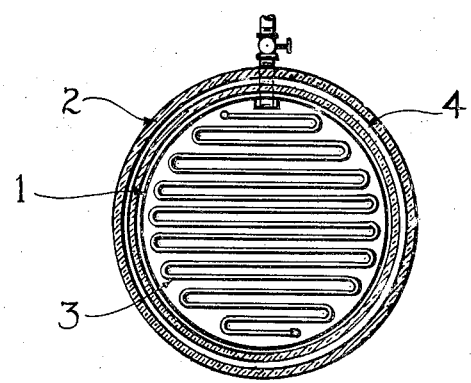
Fig. 2 is a section on line II—II of Fig. 1.

Referring to Figs. 1 and 2, numeral 1 denotes a tank having insulated side walls 2 and containing cooling coils or the like 3. The top and bottom of the tank should also be insulated, but it is not ordinarily necessary to provide positive temperature controlling means for them. Within the insulation is disposed a pipe 4, preferably in a relatively closely spaced coil. Pipe 4 has a suitable inlet 5 and outlet 6 for the temperature controlling fluid, which may be supplied by pump 7 or in any other desired manner. This fluid may be a liquid, gas, or vapor, depending upon the particular conditions or available sources of supply. Cold brine is ordinarily used when paraffin wax is to be precipitated. Suitable cooling means for the fluid, and thermometers or other measuring instruments, valves, and the like, for regulating its flow, may be provided in convenient locations. The capacity of pipe 4 should be such as to accommodate a relatively large body of fluid, so as to minimize the temperature drop between the inlet and the outlet of the pipe. The heat insulation should be adequate to prevent ready access of heat to the pipe. In some cases the pipe may be provided with insulation independent of that on the tank.

Figure 3:
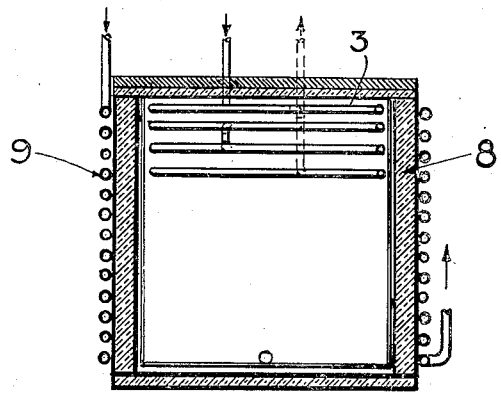
Fig. 3 is a vertical section of an alternative form of the invention.

While I prefer to embed the temperature controlling means partially or completely in the insulation, it is possible to obtain some of the advantages of the invention with a coil disposed on the outside of the tank, as shown in Fig. 3. In this figure, 8 denotes the insulated tank wall encircled by coil 9. When fluid having a temperature approximating the desired temperature of the liquid in the tank is passed through the coil, the wall is shielded from heat transference.

I am aware that it is old to install cooling coils within and adjacent to the inner walls of containers, but such coils do not perform the function of those described herein. A coil immersed in the liquid to be cooled cannot prevent access of heat from without unless its temperature is lower than that of the liquid. An attempt to maintain such a condition will merely result in a corresponding reduction in the temperature in at least a portion of the liquid, since heat equalization takes place rapidly between the liquid and the fluid conveyed through the coil. While exterior cooling coils are frequently employed in known constructions, so far as I am aware the combination of exterior coils with insulated walls to prevent heat transference is new in the art.

It is theoretically possible to avoid heat exchange in an uninsulated tank by circulating through coils passing about the walls of the tank, a refrigerant which absorbs heat without change in temperature. Such a refrigerant may be liquid ammonia under pressure just sufficient to make it boil at the desired temperature, and flowing in coils so closely arranged that no material heat leakage takes place between the walls and the spaces between the coils. It is generally impractical to adopt this expedient, however, and I contemplate the use of insulation as an auxiliary to the temperature controlling means in most cases.

The invention is not limited to uses in which a liquid is to be maintained below atmospheric temperature. Objectionable thermal circulation currents may be set up in liquids having higher temperatures, and the principles disclosed herein may be advantageously applied under these conditions.

I claim:

1. A container having a heat insulated wall and adapted to hold a body of liquid at a temperature below its boiling point, means for cooling the body of the liquid, means for preventing substantial increase or decrease in the temperature of the liquid, said means comprising a conduit traversing said wall and in temperature controlling relation thereto, and a stream of fluid passing through said conduit and adapted to control the heat exchange between the liquid and the exterior of the container, without imparting any substantial amount of heat to the liquid, whereby thermal circulation currents in the liquid are minimized.

2. A container having a heat insulated wall and adapted to hold a body of liquid at a temperature below its boiling point, means for cooling the body of liquid, means for preventing substantial increase or decrease in the temperature of the liquid, said means comprising a conduit extending in a circuitous path through the insulation and in proximity to an extended surface of said wall, and a stream of fluid passing through said conduit and adapted to control the heat exchange between the liquid and the exterior of the container, without imparting any substantial amount of heat to the liquid, whereby thermal circulation currents in the liquid are minimized.

3. A cold-settling tank for petroleum oils, comprising a heat insulated wall, means for cooling the contents of the tank to cause separation of waxy bodies therefrom, and means for minimizing transfer of heat from without to the contents of the tank, said last mentioned means comprising a heat insulated pipe adapted to convey a cooling liquid.

4. The invention according to claim 3, in which the pipe is embedded in the insulation of the tank wall.

5. Process of facilitating deposition of solids from liquids, comprising cooling the liquid, maintaining the liquid in a cooled body protected from internal disturbances, and minimizing thermal circulation due to heat transference with the exterior by passing about the body of liquid a fluid adapted substantially to prevent transfer of heat between the liquid and the exterior.

6. Process of separating waxy bodies from petroluem oils, comprising cooling the oil to a suitable temperature, and minimizing thermal circulation currents by passing a temperature controlling liquid through an insulated zone surrounding the oil.

7. Process of minimizing the transfer of heat through a body of heat-insulating material to a cooled substance to be protected from heat, comprising cooling the substance, causing a fluid to traverse the insulating material in a circuitous path, and maintaining the fluid at substantially the same temperature as the substance to be protected from heat.

WARREN K. LEWIS.